United States Patent Office 3,333,776
Patented Aug. 1, 1967

3,333,776
HYDROPHOBIC SILICA AS A GRINDING AID
Lawrence A. Rauner, Midland, and William J. Maynard, Sanford, Mich., assignors to Dow Corning Corporation, Midland, Mich., a corporation of Michigan
No Drawing. Filed Apr. 5, 1965, Ser. No. 445,784
3 Claims. (Cl. 241—22)

This application relates to the use of hydrophobic, powdered silica as an aid in the preparation of finely-divided materials by means of a ball-type mill.

This type of milling is performed by means of a rotating chamber within which there are placed free-rolling grinding media such as steel or tungsten carbide balls, ceramic cylinders, or flint pebbles, plus the particulate material to be milled. The rolling chamber causes the grinding media to engage in abrasive action, crushing and dividing the material to be milled.

The grinding action is often improved by including an inert liquid that is not a solvent for the material to be milled to fluidize the medium and serve as a heat-transfer agent.

Related techniques for milling use other ways of agitating the grinding media in order to obtain the abrasive action, cone-shaped chambers designed for continuous operation, and particulate grinding media such as sand, but they essentially embody the ball-type milling process.

Further details concerning the ball-type milling process can be found in Bulletin P-290 entitled Jar, Ball, and Pebble Milling Theory and Practice, published by the U.S. Stoneware Co. of Akron, Ohio.

This application relates to a process for producing finely-divided materials comprising grinding in a ball-type mill a composition consisting essentially of (a) 10 parts by weight of a particulate, nonmalleable, brittle, solid material, (b) from 0.1 to 2 parts of a silica powder having a surface of at least 20 square meters per gram, the surface area of which has been rendered hydrophobic by treatment with an organosilicon compound selected from the group consisting of organo and haloorganosilazanes, organo and haloorganosiloxanes, and hydroxyl-reactive organo and haloorganosilanes, all containing no more than 20 Si atoms per molecule, and (c) from 5 to 20 parts of a volatile, inert liquid that is not a solvent for (a), where the combination of (a), (b), and (c) is a free-flowing slurry throughout said grinding process.

It has been found that the addition of ingredient (b) as shown above causes a marked improvement in the grinding process. The presence of treated silica causes the grinding to proceed more rapidly and provides a more finely ground product than grinding without silica or in the presence of untreated, hydrophilic silica. Many of the powdered products of this improved process are fine enough to show fluid behavior upon shaking, in the manner of lycopodium powder, only generally to a much greater extent.

Ingredient (a) can be any particulate, nonmalleable, brittle, solid material. It must be particulate to be grindable in a ball-type mill, and the maximum particle size depends on the size of the grinding balls, stones, etc., which must be considerably larger than the particles to be ground. It is also required that the grinding stones be of a greater hardness than the particles to be ground.

Any material of the above description can be ground by the process of this invention. Examples of suitable materials that can be ground are coke, charcoal, sugar, ammonium chloride, sodium chloride, sodium borate, resorcinol, copper sulfate, sodium bicarbonate, methyl benzilate, soluble saccharin, p-aminobenzoic acid, limestone, marble, talc, silicon, D.D.T. titania and other paint pigments, ammonium phosphate, potassium phosphate, feldspar, starch, and cured epoxy, alkyd, or silicone resins.

Ingredient (b) can be any silica as defined above that has a water-repellent surface imparted by treatment with an organosilicon compound as defined above. There are many known ways of doing this, the preferred method being to treat the silica with hexamethyldisilazane. This can be done before adding the silica to the ball-type mill or by adding the silazane directly to the mixture to be milled in the cases where ingredient (a) is nonreactive to the silazane, i.e., is free of water and reactive hydroxyl groups.

The amount of silazane required generally varies with the particle size of the silica. When the silica has a surface area of 400 square meters per gram, a minimum of about 8 weight percent of hexamethyldisilazane or other reactive silicone, based on the weight of the silica, is required to make a strongly hydrophobic silica. The minimum amount of hexamethyldisilazane required tends to be proportional to the surface area of the silica, e.g. silica with a surface area of 200 square meters requires a minimum of about 4 weight percent of hexamethyldisilazane.

There is no maximum limit of silazane that can be added to the silica; even 100 weight percent of silazane is operative.

Generally more than the minimum amounts of silazane are required if it is added as a separate ingredient to the mixture to be milled.

Other organo and haloorganosilicon compounds can be used in place of the above silazane to render silica hydrophobic, as is well-known to the art.

By "organo" is meant any monovalent organic group, e.g. alkyl and cycloalkyl radicals such as methyl, ethyl, isopropyl, sec-hexyl, octadecyl, or cyclohexyl; any aliphatically unsaturated radical such as ethynyl, vinyl, allyl, cyclopentenyl, or 4-hexenyl; and any aryl-containing radical such as phenyl, xenyl, naphthyl, benzyl, tolyl, or 2-phenylpropyl.

By "haloorgano" is meant any monovalent haloorgano group, e.g., 3,3,3-trifluoropropyl, 4-chlorohexyl, bromocyclopentyl, 8,8-dibromodecyl, 3-chloroallyl, chloropheny, dibromophenyl, $\alpha,\alpha,\alpha$-trifluorotolyl, $\beta$-pentafluorophenylethyl, and chloroxenyl.

Other silazanes such as hexamethylcyclotrisilazane, phenylmethyloctasilazane, 3,3,3-trifluoropropyldimethyldisilazane, and hexylpolysilazane are operative to render silica hydrophobic. They are believed to react with adsorbed moisture or chemically attached hydroxyl groups on the silica, thereby becoming themselves tightly associated with the silica, and imparting a hydrophobic nature to the silica surface.

U.S. Patent 2,610,167 deals with the general principle of the hydrophobing of a silica surface, and contains a list of organosilicon compounds which are operative for this purpose.

Organo and haloorganosiloxanes can also be used to render silica hydrophobic. Particularly preferred are the cyclotrisiloxanes, e.g. hexamethylcyclotrisiloxane, triphenyltrimethylcyclotrisiloxane, trihexyltrimethylcyclotrisiloxane, tris-chlorophenyltriethylcyclotrisiloxane, and tris-3,3,3-trifluoropropyltrimethylcyclotrisiloxane, especially in the presence of an alkaline catalyst such as ammonia. The use of cyclotrisiloxanes and an alkaline catalyst to produce hydrophobic silica powders is disclosed in the copending U.S. patent application No. 426,293, filed Mar. 1, 1965.

Other usable siloxanes are octamethylcyclotetrasiloxane, 3,3,3-trifluoropropylmethylpolysiloxane, phenylmethylpolysiloxane, and ethylmethylpolysiloxane. These, however, must generally be heated at about 200° C. in the presence of the silica in order to impart true hydrophobicity to the silica, as is described in U.S. Patent 2,938,009.

Organo and haloorganosiloxanes with hydroxyl-reactive groups are also usable in rendering silica hydrophobic, e.g. chlorine or hydroxyl endblocked dimethylpolysiloxane and partial hydrolyzates of the silanes mentioned below.

Hydroxyl-reactive organo and haloorganosilanes and siloxanes are also useful for rendering silica hydrophobic. A hydroxyl-reactive silane is one that possesses a silicon-bonded, hydroxyl-reactive substituent, e.g. the hydroxyl group itself, alkoxy groups such as methoxy or ethoxy, acyloxy groups such as acetoxy, halogen groups such as chlorine or bromine, dialkyl-substituted isocyanoxy groups such as

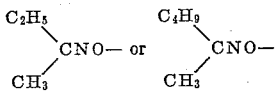

the amino group, or the isocyanate group.

Examples of such silanes are trimethylchlorosilane, 3,3,3-trifluoropropyltrichlorosilane, phenyldimethylbromosilane, hexyltrimethoxysilane, dimethyldiacetoxysilane, propyltriacetoxysilane,

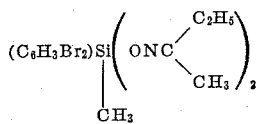

and phenylmethyldisilanol.

When the hydroxyl-reactive group on the silane or siloxane is alkoxy or hydroxy, it is desirable to use a catalyst, as described in U.S. Patent 3,024,126. Another pertinent patent is U.S. 2,993,809, which deals with the hydrophobing of silica by means of chlorosilanes or alkoxysilanes.

The above is only a partial list of the silicones that are known to be useful in rendering silica hydrophobic.

All of the above-mentioned patents are considered to be incorporated by reference into this application.

It is preferred for the organosilicon hydrophobing agents to have an average of no more than 3 silicon atoms per molecule.

Ingredient (c) can be any volatile, inert liquid that is not a solvent for ingredient (a). It serves as a fluidizing agent, and a sufficient amount of it must be present to keep the grinding mixture fluid at all stages of the grinding process.

A suitable liquid for many ingredients (a) is a silicone fluid with a viscosity of less than 50 cs. at 25° C., e.g. hexamethyldisiloxane, octamethylcyclotetrasiloxane, phenylmethylpolysiloxane, 3,3,3-trifluoropropylmethylpolysiloxane, copolymers of phenylmethylsiloxane and dimethylsiloxane, and copolymers of bromophenylmethylsiloxane and dimethylsiloxane.

Other potential ingredients (c) are naphtha, gasoline, kerosene, dibutylether, methylethylketone, tetrahydrofuran, benzene, chlorobenzene, carbon tetrachloride, tetrafluorodichloroethane and dibutylether.

After the grinding process is complete, the fluidizing ingredient (c) can be removed by any desired method, for example by filtering or evaporating, to recover a finely powdered mixture of ingredients (a) and (b).

An additional advantage of the process of this invention is that its powdered product is generally more free flowing and hydrophobic than powders ground by the prior art methods, minimizing any tendency of the powder toward agglomeration.

The process of this invention is useful for making easily dispersible solid insecticides and other toxic agents, and for making powders that have flow characteristics that approximate those of a fluid.

The following examples are illustrative only and should not be construed as limiting the invention which is properly delineated in the appended claims.

*Example 1*

(a) To 200 ml. of a mixture of saturated hydrocarbons having an average of about 6 carbon atoms per molecule (Skelly "F" solvent), there was added 3 grams of a finely divided silica having a surface area of 325 square meters per gram and 0.5 gram of hexamethyldisilazane.

This was placed in a U.S. Stoneware BF–00, 0.3 gal. capacity, ball-mill jar containing 360 g. of $13/16''$ x $13/16''$ Burundum rods and 390 g. of $1/2''$ x $1/2''$ Burundum rods and milled for 15 minutes to insure treatment of the silica and grinding surfaces of the mill with the silazane.

To this was then added 100 grams of the pulverized reaction product of $NCCH_2CN$ and chlorobenzaldehyde to form a slurry, and the mixture was milled for 24 hours.

The mixture was then removed from the mill and the hydrocarbon fluidizing agent allowed to evaporate.

The product was a soft cake. It was disintegrated by dry-grinding in a ball mill similar to the one above for 15 minutes to yield a free-flowing powder with 98 percent of its particles smaller than 5 microns, and essentially all of its particles smaller than 10 microns.

(b) The above experiment was repeated, omitting the silica and the hexamethyldisilazane ingredients.

A slightly less free-flowing powder than the powder of (a) resulted with 93 percent by weight of its particles being smaller than 10 microns.

(c) The experiment of (a) was again repeated, omitting the hexamethyldisilazane ingredient.

A powder that was considerably less free-flowing than the power of (a) resulted, with 43 percent by weight of its particles smaller than 10 microns.

(d) The experiment of (a) was repeated, omitting the silica ingredient, and using 0.375 g. of hexamethyldisilazane.

A poorly-flowing powder resulted with 75 percent by weight of its particles smaller than 10 microns.

Experiments (b), (c), and (d) are shown for comparison, and are not within the scope of the claims of this application.

*Example 2*

(a) The experiment of Example 1(a) was repeated, using 200 grams of NaCl crystals in place of the $NCCH_2CN$-chlorobenzaldehyde reaction product, 0.5 g. of hexamethyldisilazane, 340 grams of the hydrocarbon fluidizer of Example 1, and 6 grams of the silica of Example 1.

The slurry was ground in the ball mill for 20 hours.

After the 15 minute dry grind, a free-flowing powder was recovered with 96 percent of its particles smaller than 5 microns and essentially all of its particles smaller than 10 microns.

(b) The experiment of 2(a) was repeated, omitting the silica and the hexamethyldisilazane ingredients and using 500 ml. of the hydrocarbon fluidizer.

The product was a cake that could not be disintegrated by dry milling. 75 percent of the particles of the cake were smaller than 5 microns, and 96 percent of the particles were smaller than 10 microns.

*Example 3*

(a) A mixture of 340 ml. of a saturated hydrocarbon mixture having an average of about 6 carbon atoms per molecule, 2 g. of a powdered silica having a surface area of 325 square meters per gram, and 0.37 g. of hexamethyldisilazane were milled in the ball mill used in Example 1 for 15 minutes.

There was then added 100 g. of granular ammonium chloride to make a slurry, and the mixture was then milled for 40 hours.

The pulverized mixture was then separated, and the fluidizing hydrocarbon allowed to evaporate.

The resulting cake was dry-ground for 15 minutes in the ball mill to yield a free-flowing powder with 95 percent of its particles smaller than 5 microns and 99 percent of its particles smaller than 10 microns. 70 percent by weight of its particles were smaller than 10 microns.

(b) The experiment of 3(a) was repeated, using 0.12 gram of hexamethyldisilazane, and grinding the slurry for 45 hours.

The dried product was dry-ground for ½ hour to yield a free-flowing powder with 64 percent of its particles smaller than 5 microns and 88 percent of its particles smaller than 10 microns. 21 percent by weight of its particles were smaller than 10 microns.

*Example 4*

(a) To about 200 g. of crushed NaCl crystals there was added 300 ml. of a mixture of saturated hydrocarbons having an average of about 6 carbon atoms per molecule, and 6 g. of finely divided silica having a surface area of about 300 square meters per gram.

This mixture was ground in the ball-mill described in Example 1 for 20 hours. The fluidizing hydrocarbon was then evaporated, and the resulting cake was ground in the mill for 15 minutes to yield a powder having 45 percent by weight of its particles smaller than 10 microns.

(b) The experiment of (a) was repeated using an equal weight of a finely-divided silica that had been rendered hydrophobic with trimethylchlorosilane.

The powdered product had 100 percent of its particles of a size smaller than 10 microns.

*Example 5*

(a) To 200 grams of NaCl crystals there was added 6 grams of a finely-divided silica having a surface area of about 325 square meters per gram and 340 ml. of the fluidizing hydrocarbon of Example 4.

(b) To 200 grams of NaCl crystals there was added 340 ml. of the fluidizing hydrocarbon of Example 4 and 6 grams of a finely divided silica (about 400 square meters per gram surface area) which had been treated with about 15 weight percent of hexamethylcyclotrisiloxane in the presence of ammonia. The treated silica was hydrophobic.

(c) A composition similar to (b) above was prepared except that the silica was treated with tris-3,3,3-trifluoropropyltrimethylcyclotrisiloxane in the presence of ammonia. The treated silica was hydrophobic.

Compositions (a), (b), and (c) were each ground for 22½ hours in a ball-mill similar to the one used in Example 1.

The fluidizing hydrocarbon was then removed from each of the compositions, and they were dry-ground for 15 minutes to yield powders.

In composition (a), 30 to 40 percent by mass of the powder particles were smaller than 10 microns.

In compositions (b) and (c), 95 to 100 percent by mass of the ground particles were smaller than 10 microns.

*Example 6*

When 100 grams of sugar crystals are added to 150 grams of hexamethyldisiloxane and 10 grams of finely-divided silica which has been rendered hydrophobic by treatment with hexylethyldimethoxysilane in the presence of $(CH_3)_4NOH$, a composition is formed that is readily ground in a ball-mill to a smaller average particle size than a composition consisting of sugar crystals and hexamethyldisiloxane alone.

*Example 7*

When 100 grams of D.D.T. flakes are mixed with 50 grams of octamethylcyclotetrasiloxane, 150 grams of toluene, and 15 grams of finely-divided silica which has been rendered hydrophobic by treatment with phenyldimethylacetoxysilane, a composition is formed that is readily ground in a ball-mill to a smaller average particle size than a composition consisting of the same portions of D.D.T. flakes, octamethylcyclotetrasiloxane, and toluene alone.

That which is claimed is:

1. A process for producing finely-divided materials comprising grinding in a ball-type mill a composition consisting essentially of
    (a) 10 parts by weight of a particulate, nonmalleable, brittle, solid material,
    (b) from 0.1 to 2 parts of a silica powder having a surface area of at least 20 square meters per gram, the surface of which has been rendered hydrophobic by treatment with an organosilicon compound selected from the group consisting of organo and haloorganosilazanes, organo and haloorganosiloxanes, and hydroxy-reactive organo and haloorganosilanes, all containing no more than 20 Si atoms per molecule, and
    (c) from 5 to 20 parts of a volatile, inert liquid that is not a solvent for (a), where the combination of (a), (b), and (c) is a free-flowing slurry throughout said grinding process.

2. The process of claim 1 where (b) is rendered hydrophobic by treatment with hexamethyldisilazane.

3. The process of claim 1 where (c) is a mixture of saturated hydrocarbons having an average of from 5 to 6 carbon atoms per molecule.

References Cited

UNITED STATES PATENTS

| | | | |
|---|---|---|---|
| 2,591,988 | 4/1952 | Willcox | 241—22 |
| 3,126,293 | 3/1964 | McSheely | 241—22 XR |
| 3,176,925 | 4/1965 | Huband | 241—22 XR |

WILLIAM W. DYER, JR., *Primary Examiner.*

HARRY F. PEPPER, JR., *Examiner.*